United States Patent
Yazdi et al.

(10) Patent No.: US 11,379,928 B2
(45) Date of Patent: Jul. 5, 2022

(54) SYSTEM AND METHOD FOR GENERAL LEDGER PROCESSING

(71) Applicant: JPMorgan Chase Bank, N.A., New York, NY (US)

(72) Inventors: Matthew Yazdi, Scarsdale, NY (US); Laura Michelle Miller, Syosset, NY (US); Fazil Syed, North Brunswick, NJ (US); Anil Terli, Basking Ridge, NJ (US); Vyacheslav Betser, Cliffside Park, NJ (US); Walter So, Parsippany, NJ (US); Sajani A. Geria, East Brunswick, NJ (US); Ravindra R. Deoray, Bridgewater, NJ (US)

(73) Assignee: JPMORGAN CAHSE BANK, N.A., New York, NY (US)

(\*) Notice: Subject to any disclaimer, the term of this patent is extended or adjusted under 35 U.S.C. 154(b) by 393 days.

(21) Appl. No.: 16/131,408

(22) Filed: Sep. 14, 2018

(65) Prior Publication Data
US 2019/0080419 A1    Mar. 14, 2019

Related U.S. Application Data

(60) Provisional application No. 62/558,529, filed on Sep. 14, 2017.

(51) Int. Cl.
*G06Q 40/00* (2012.01)
*G06Q 10/10* (2012.01)

(52) U.S. Cl.
CPC ......... *G06Q 40/12* (2013.12); *G06Q 10/1093* (2013.01)

(58) Field of Classification Search
CPC .................................................... G06Q 40/12
See application file for complete search history.

(56) References Cited

U.S. PATENT DOCUMENTS

| 10,489,865 B1 \* | 11/2019 | Dillard | G06Q 40/12 |
| 2005/0038721 A1 \* | 2/2005 | Goeckel | G06Q 10/10 |
| | | | 705/30 |

(Continued)

OTHER PUBLICATIONS

Apache Hadoop 3.0.0, "The Hadoop FileSystem API Definition", Aug. 4, 2017 (Year: 2017).\*

(Continued)

*Primary Examiner* — Florian M Zeender
*Assistant Examiner* — Vanessa Deligi
(74) *Attorney, Agent, or Firm* — Greenblum & Bernstein, P.L.C.

(57) ABSTRACT

The invention relates to a computer-implemented system and method for scalable, customized general ledger processing. The method may include the step of receiving a client request for customized charts of accounts (COAs) according to a specified time frame. The customized COAs may include client-specific data and third party reference data. The method may involve automatically receiving source information, including position data and transaction data, from a number of sources. The system may include a distributed computer architecture such as Hadoop for parallel storage and processing of the source information across a plurality of nodes. The system can generate debit and credit postings from the source information, roll up the postings into the plurality of customized COAs, and deliver them to the client according to the client's preferred schedule, including in real time or near real time.

22 Claims, 6 Drawing Sheets

(56) References Cited

U.S. PATENT DOCUMENTS

| | | | | |
|---|---|---|---|---|
| 2005/0222928 A1* | 10/2005 | Steier | ............. | G06Q 40/00 |
| | | | | 705/35 |
| 2005/0222945 A1* | 10/2005 | Pannicke | ............. | G06Q 40/10 |
| | | | | 705/39 |
| 2007/0088636 A1* | 4/2007 | Nault | ............. | G06Q 40/02 |
| | | | | 705/30 |
| 2010/0325021 A1* | 12/2010 | Fasching | ............. | G06Q 40/12 |
| | | | | 705/30 |
| 2011/0093370 A1* | 4/2011 | Nault | ............. | G06Q 40/02 |
| | | | | 705/30 |
| 2014/0040182 A1* | 2/2014 | Gilder | ............. | G06F 16/256 |
| | | | | 707/602 |
| 2014/0114817 A1* | 4/2014 | Moore | ............. | G06Q 40/125 |
| | | | | 705/30 |
| 2016/0232566 A1* | 8/2016 | Bonalle | ............. | G06Q 30/0255 |
| 2016/0275626 A1* | 9/2016 | Lee | ............. | G06Q 40/12 |
| 2016/0379132 A1* | 12/2016 | Jin | ............. | H04L 67/22 |
| | | | | 706/12 |
| 2017/0221160 A1* | 8/2017 | Elliott | ............. | B67D 7/305 |
| 2018/0121135 A1* | 5/2018 | Lee | ............. | G06F 3/0613 |

OTHER PUBLICATIONS

Ecolane, "8 Advantages of Using the Web as a Transit Reporting Platform", Nov. 23, 2015 (Year: 2015).*

Conversioner, "Real Time Reporting—benefits of real time reporting", Dec. 12, 2016 (Year: 2012).*

EmergeNext ADNM "Microsoft Dynamics NAV: Managing Multiple GAAP's", Jun. 24, 2014 (Year: 2014).*

EmergeNext ADNM "Microsoft Dynamics NAV: Managing Multiple GAAP's", Jun. 24, 2014 (Year: 2014) (Year: 2014).*

\* cited by examiner

| | GL required functionality |
|---|---|
| Features | Currency level G/L |
| | Debit/Credit Postings detail output, with local transaction attributes |
| | Client custom instrument, transaction COA criteria |
| | -- e.g. 'region', 'maturity band', custom asset class, dummy cash 'purpose', IFRS 'holding intent', "impairment level", "affiliate" security |
| | Share class G/L |
| | Multi-manager GL aggregation |
| | Investor level (Tax Transparent Funds); security id level balances |
| | Tax lot (Long /short term GL -- USA) |
| | Fund of Fund Look Through, including 3rd party (external specialized accounting systems for OTC swaps, bank loans, private equity, hedge funds, off balance sheet collateral) |
| | handle multi-GAAP posting distinctions |
| | 3rd party journal interface (for onboardings, other external) |
| Scale | Financial Reporting -- periodic feeds per client calendar |
| | Potential to produce GL bucketed data on intraday or near-RT data. |
| Data Integrity | Solution raises exceptions for un-(mis)classified, unbalanced postings |
| | Solution reconciles G/L (detail) to accounting source |
| | Solution will stop rpts to clients with severe exceptions |
| | Four eyes checks on manual journals, G/L signoffs and reruns |
| | Fund of Fund sequencing and balance checks |
| Rerunability | Re-Run upon instrument & meta data changes, w/o Re-Open on WINS as of reference data maintained (account, client / security master etc.) |
| Time to Market | ability to quickly absorb new source data fields, including client specific OPS tools to configure GL meta data |
| Reports | data available through all new output channels, api's, browsers, etc. |

Figure 4

| GL Event Type | GAAP TYPE | GL Event Date Type | Ledger Code | Sign GL Amount Code | example |
|---|---|---|---|---|---|
| BUY | | Trade Date | A000014 - Investments at Value - Cost | - Commission Base--Trade Date amount | 10 |
| BUY | | Trade Date | A000014 - Investments at Value - Cost | - Other Expenses Base--Trade Date Amount | 5 |
| BUY | | Trade Date | A000014 - Investments at Value - Cost | - Principal Base--Trade Date Amount | -100 |
| BUY | | Trade Date | A000061 - Debtors - Accrued Interest - Purchases | - Purchased / Sold Interest Base--Trade Date Amount | 8 |
| BUY | | Trade Date | L000010 - Creditors - Accrued Interest Purchases | + Purchased / Sold Interest Base--Trade Date Amount | -8 |
| BUY | | Trade Date | L000030 - Creditors - Unsettled Security Purchases | + Net Principal Base--Trade Date Amount | 85 |
| BUY - EXP | IFRS | Trade Date | A000014 - Investments at Value - Cost | - Principal Base--Trade Date Amount | -100 |
| BUY - EXP | IFRS | Trade Date | A000061 - Debtors - Accrued Interest - Purchases | - Purchased / Sold Interest Base--Trade Date Amount | 8 |
| BUY - EXP | IFRS | Trade Date | E000030 - Paid - Comm Expense on Security Purchases | - Commission Base--Trade Date Amount | 10 |
| BUY - EXP | IFRS | Trade Date | E000031 - Paid - Other Expenses on Security Purchases | - Other Expenses Base--Trade Date Amount | 5 |
| BUY - EXP | IFRS | Trade Date | L000010 - Creditors - Accrued Interest - Purchases | - Purchased / Sold Interest Base--Trade Date Amount | -8 |
| BUY - EXP | IFRS | Trade Date | L000030 - Creditors - Unsettled Security Purchases | + Net Principal Base--Trade Date Amount | 85 |

Figure 5A

IFRS
A000014 - Investments at Value - Cost                              -100 Dr
A000061 - Debtors - Accrued Interest - Purchases                      8 Cr
L000010 - Creditors - Accrued Interest - Purchases                   -8 Dr
L000030 - Creditors - Unsettled Security Purchases                   85 Cr
E000030 - Paid - Comm Expense on Security Purchases                  10 Cr
E000031 - Paid - Other Expenses on Security Purchases                 5 Cr

Figure 5B

UK GAAP
A000014 - Investments at Value - Cost                               -85 Dr
A000061 - Debtors - Accrued Interest - Purchases                      8 Cr
L000010 - Creditors - Accrued Interest - Purchases                   -8 Dr
L000030 - Creditors - Unsettled Security Purchases                   85 Cr

Figure 5C

SYSTEM AND METHOD FOR GENERAL LEDGER PROCESSING

RELATED APPLICATION

This application claims priority to U.S. Application No. 62/558,529, filed Sep. 14, 2017, entitled "System and Method for General Ledger Processing," which is hereby incorporated by reference.

FIELD OF THE INVENTION

The present invention relates generally to general ledger processing, and more particularly to a scalable and customizable general ledger processing system.

BACKGROUND

Companies and other organizations use various general ledger software to handle their accounting requirements. A company's general ledger refers to its set of accounts used for its accounting records. The general ledger provides an account of the company's financial transactions and holds account information needed to prepare financial statements. It typically includes accounts for assets, liabilities, owners' equity, revenues and expenses.

Although existing general ledger software works well in many environments, e.g., small businesses, there are a number of challenges that arise when additional demands are imposed. For example, global financial service providers may have clients that include asset managers and institutional asset owners who manage various types of funds such as pension funds, insurance funds, mutual funds, hedge funds, endowments, and other fund types. Scalability is one of the challenges that such global financial service providers face. Existing general ledger systems are typically constrained by infrastructure capacity and generally require multiple separate instances to be maintained in order to handle very large volumes, resulting in high costs of licensing, infrastructure and related labor.

Flexibility is another challenge, as a given fund may have multiple GAAP (generally accepted accounting principles) views of its accounting, as well as one or more client views of its general ledgers. In a given chart of accounts, the roll up of postings into resulting balances may be driven from any number of posting and instrument attributes. Furthermore, the fund may be serviced by more than one inventory control/tax lot reporting accounting system, as there may be specialized systems used for private equity, real estate, derivatives, and loans, for example. Existing general ledger systems are limited in their abilities to represent these views. Existing general ledger systems are also limited in their abilities to create balances and postings at investor, share class, manager rollup and/or instrument level.

Another challenge relates to the availability of current data. In known systems, standard views of the general ledger look backward for financial reporting purposes on prior reporting periods. However, they generally do not enable real time or near real time views, which would be of significant benefit to a global service provider and its clients.

Thus, available general ledger software suffers from some significant drawbacks. It would be beneficial, therefore, to have a general ledger processing system performing at an enterprise-wide scale for fund accounting such as provided by global service providers that overcame the foregoing disadvantages.

SUMMARY

According to one embodiment, the invention relates to a computer-implemented system and method for scalable, customized general ledger processing. The method may be conducted on a specially programmed computer system comprising one or more computer processors, electronic storage devices, and networks. The method may comprise the steps of: receiving a request from a client for a plurality of customized charts of accounts (COAs) according to a specified time frame, wherein the customized COAs include client-specific data and third party reference data; automatically receiving source information from a plurality of sources, the source information comprising position data and transaction data; structuring the source information at an account level to partition the source information; distributing the source information across a plurality of nodes in a distributed computer architecture used for parallel storage and processing; generating debit and credit postings from the source information; rolling up the debit and credit postings into the plurality of customized COAs; and providing the customized COAs electronically to the client in accordance with the specified time frame.

The invention also relates to a computer implemented system for scalable, customized general ledger processing, and to a computer readable medium containing program instructions for executing a method for scalable, customized general ledger processing.

Exemplary embodiments of the invention can provide a number of advantages to a global service provider and its clients. For example, the general ledger (GL) processing system can provide a solution to the scale and adaptability demands of a broad client base of fund accounting service providers. The GL processing system can serve as an aggregator of postings from varied sources, and it can also aggregate posting activity from third party client-side systems. The GL processing system can be configured as a general ledger data hub against multiple views on client data, combining data housed in several source systems. It can leverage enterprise account and client reference data, and this can be used to support drill through across a client's fund of funds, regardless of data source. Client security and classifications reference data can be captured and leveraged. Integration with real time order modelling position management can provide data in the same chart of account buckets as leveraged for past period financial reporting, thereby providing better insight on data for a client, using the buckets best reflective of their organizations and their strategies.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4 illustrates a table of features of the general ledger processing system according to an exemplary embodiment of the invention.

FIGS. 5A-5C illustrate an example of general ledger processing according to an exemplary embodiment of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
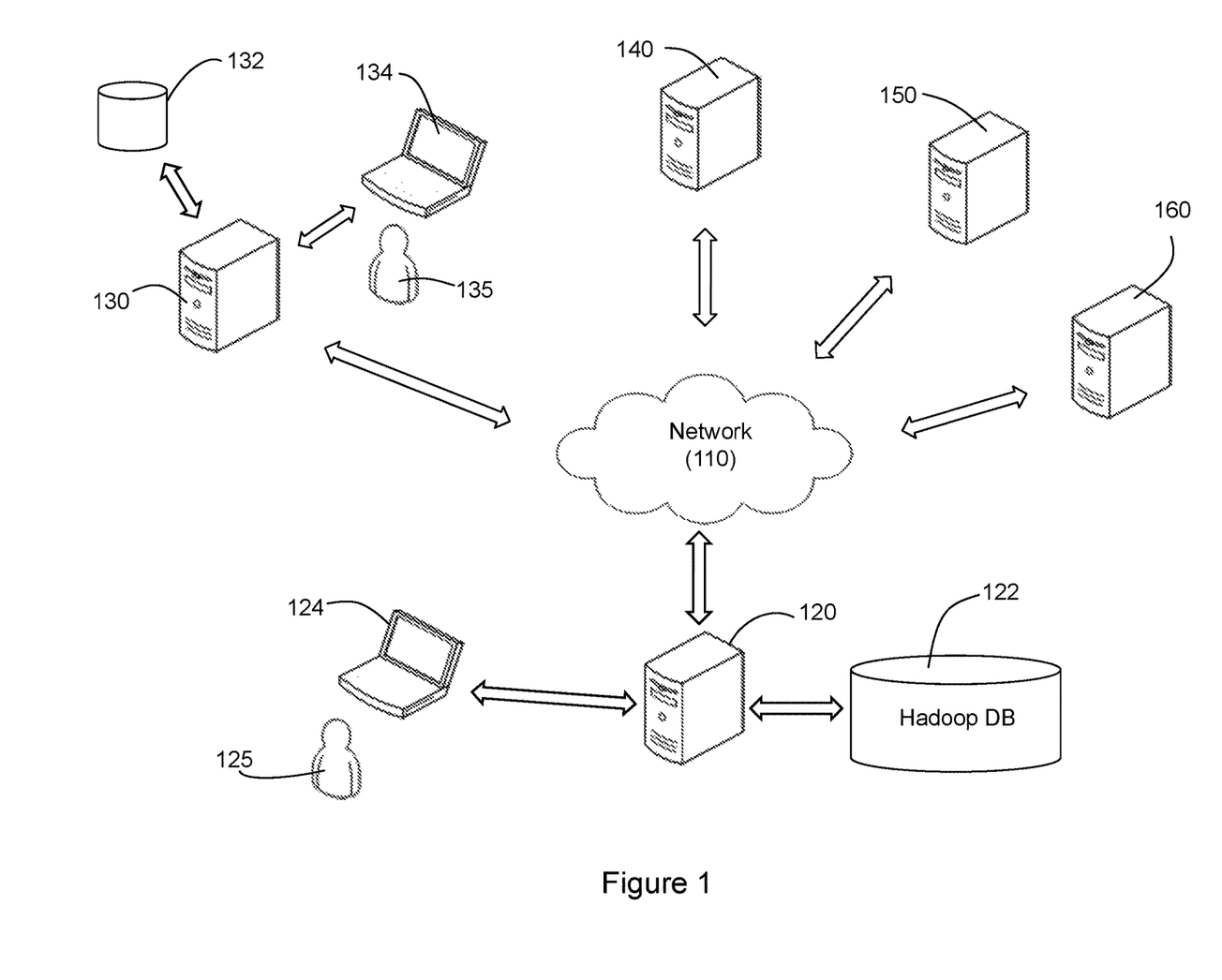
FIG. 1 is a diagram of a general ledger processing system according to an exemplary embodiment of the invention.

According to one embodiment, the invention relates to a big data general ledger processing system (referred to herein as the "GL processing system") meeting the scale and broad flexibility capabilities desired by fund accounting service providers and their clients such as asset managers and institutional asset owners. FIG. 1 is a diagram of the GL processing system according an exemplary embodiment of the invention. The GL processing system can be built as a native Hadoop-based general ledger engine, for example, that leverages the platform's ability to perform large scale parallel computing. Hadoop is an open source programming framework written in Java that supports the storage and processing of very large data sets in a distributed computing environment. As shown in FIG. 1, the GL processing system may comprise a server 120 that interfaces with a Hadoop database 122. The depiction of the Hadoop database 122 in FIG. 1 represents the Hadoop architecture, which may include a multitude of nodes used for parallel storage and processing and Hadoop functionalities such as Hadoop Distributed File System (HDFS), MapReduce, Hadoop YARN, and Hadoop Common. Hadoop is designed to scale up from a single server to clusters of computers comprising thousands of machines offering local computation and storage, for example. The Hadoop database 122 thus can enable distributed processing of large datasets across clusters of computers.

A user 125 such as a fund accounting service provider can access and use the GL processing system 120 and Hadoop database 122 through a personal computing device 124, such as a laptop computer, desktop computer, or tablet computer, for example. The GL processing system may also be configured to allow one or more clients to access the system. For example, as shown in FIG. 1, the client 135, such as an asset manager or institutional asset owner, may use a personal computing device 134 and company server 130 to access the GL processing system. The client may also transmit client-specific data stored in a client database 132 to the GL processing system to be incorporated into accounting reports generated by the GL processing system customized for the client.

The GL processing system shown in FIG. 1 can capture large volumes of positions and transactions from varied sources, such as sources 140, 150, and 160. Sources may include accounting software systems such as those used within a Global Fund Services division of a major financial institution, as well as specialized systems used to track derivatives, bank loans, private equity and other alternative investments. Additionally the GL processing system may capture third party sources which may track externally held assets, or which may post tax or regulatory adjusting entries, or other memo entries. Configuration meta data is also a source of data into the GL processing system, used to define GL events, chart of accounts, posting rules, and other mapping data.

A method of providing scalable, flexible GL reports will now be described with reference to FIG. 2. The method begins in step 210 with the process of capturing source information comprising volumes and positions from sources 140, 150, and 160. This process may comprise one or more sub-processes that run on each node in the Hadoop cluster. They capture the source information by account number and date taking advantage of Hadoop's data localization significantly reducing the time it takes for the data to travel over the network.

In step 212, the GL processing system structures incoming accounting data to be organized at account and date level as the partitioning mechanism. The partitioning by account and date allows for efficient processing of thousands of independent funds/accounts with millions of rows of source information, for example. In this manner the GL processing for these funds can be run in a highly distributed, parallelized manner, rather than in a step-wise batch fashion, taking full advantage of the big data technologies. In step 214, the GL processing system distributes the source information across a large number of nodes in a statistically even distribution.

A given financial transaction may result in numerous postings of debit/credit balanced journal entries, per transaction amount, per type, per GAAP or other view, and per lifecycle date. In step 216, the GL processing system performs logic to generate debit and credit postings and performs the relevant accounting calculations simultaneously across all available nodes in the cluster. The meta data for the GL processing engine will define posting rules for the creation of these debit and credit postings, as well as resulting balance rollups. The meta data for the creation of postings may be simple or complex. Simple mapping occurs when the source system provides debit and credit journals (or provides balances not requiring break down per any further criteria). In such cases, the GL meta data will provide a mapping from the source GL account to one or more desired target GL accounts, with potential for GL account roll-up, or break-down if further detail can be obtained. For example, if the provided journals are provided at an instrument level, then any other instrument fields can drive the "break points" of the given GL account. If, however, the source system does not provide debit/credit journals at the desired level of granularity, then the GL solution can obtain source system positions and transactions along with instrument and other reference/meta data. In such cases, transaction and asset types as well as other criteria allow the GL solution to construct debit/credit postings, which in turn go through further mapping into one or more chart of account balances. Transaction type driven posting rules, for example, will map transaction types and asset types together, to a GL posting event type. A given source transaction will have multiple amounts (such as principal, fees, taxes, interest, etc. in issue, settle and fund base currency) and GL meta data will define for each GL posting event type and date type (trade date, settle date, valuation date, etc.) the given amount fields which will be debited or credited to any given GL account. The same transaction can be given discrete posting rules per GAAP type, as illustrated in FIG. 5.

According to an exemplary embodiment, to construct postings where not provided from source, the incoming positions and transactions use GL meta data to define the lowest level amounts and attributes. These positions and transactions in turn have associated instrument and fund reference data, which allow for granular posting to any defined chart of accounts. The postings so defined are then flexibly aggregated through additional GL meta data, resulting in one or more sets of balances, for target chart(s) of accounts. A given investment fund may have a distinct chart of accounts for its primary fund accounting, and other charts for other statutory/multi-GAAP needs. These charts may be further distinguished by having different reporting currency, having differing level of detail needed at share class or investor level, having differing periodicity (e.g., balances created near-real-time, balances created day over day, balances re-run at key month-end, year-end or ad-hoc dates such as per client holiday calendar rules), or by having need to include or exclude as-of instrument or source data updates. The volume of input data points (e.g., transactions, positions, reference data) is large, and the resulting data creation (e.g., postings, balances, exceptions, per possible chart of accounts) is also large. This use of Hadoop technology provides the ability to scale the process to extremely large volumes by sizing the cluster adequately, according to an exemplary embodiment of the invention. The GL processing system can parallelize the creation of security and transaction level debit and credit postings creation, and balances updates.

In step 218, the GL processing system can then roll up the posting level results per one or more defined chart of accounts (COA), using a variety of enterprise and client specific reference data. The COA can organize data for a fund in one or more ways, as follows.

According to one embodiment, the COA data may be tailored to the financial, regulatory, and statutory reporting requirements governing a particular fund, and it may include multi-GAAP, multi-view, and client-specific versions. The GL processing system can simultaneously create multiple GAAP and client views of the general ledger. For example, a single fund may have data sent from more than one source or source "account," where these sources may account differently for varied GAAP methods and send separately calculated results (having different periodicity, timing, FIFO/average cost method, amortization calculations, pricing source hierarchies, etc.).

Additionally, the GL processing system can itself be configured to process the same source transaction under more than one GAAP method, as illustrated in FIGS. 5A-C. The system can be designed to monitor transaction and position change events. The different transaction types can be mapped to GL posting event types having some set of debits and credits. These can be enriched with event subtype qualifiers, such as GAAP-specific handling or determination of "purpose" codes behind certain fields and security IDs. Position changes create events for gain/loss, accruals and amortization. Every discrete amount on these positions and transactions is "postable" according to one embodiment of the invention. Amounts can be linked to base currency and local (income, trade, settle) currency equivalents for currency GL.

The system can provide resulting balances in accordance with the given COA ledger codes. Journals can be posted according to GAAP handling, wherein balances exist with respect to security ID and trade number. A client-specific COA will then apply breakpoints that "tag" the individual security balances into the roll-up categories of the desired COA. For example, the asset ledger account, Investment at Value—Cost, may for a given client or GAAP COA be summed by share class, holding intent type, asset type, country of taxation, region, foreign vs. domestic holdings, and so on.

The illustration in FIGS. 5A-5C shows a single transaction having both a UK GAAP and IFRS method applied, as an example, where the latter will have a different treatment for commissions and fees. In FIG. 5, the given posting event type (a purchase of security) is given distinct posting rules based on the GAAP type of the given chart. As illustrated in the FIG. 5 example, a 'BUY' under UK GAAP vs. IFRS will have different debit/credit posting rules defined, but each set of postings will have been sourced from various amounts on the same single input transaction.

In addition, the COA may organize data for a fund in a manner that is appropriate to a given organization so that the COA provides oversight of a fund's operations and performance. This may include client-specific organizing criteria. Any instrument fact including client customized instrument facts can be used in reporting a chart of accounts. The COA may also organize the data to provide drill-through from appropriate summaries of data to underlying transaction/amount detail (e.g., drill through from GL balances to postings, to source position and transaction detail). For example, one fund may need to measure foreign vs. local assets as primary criteria as it provides reporting on its operations year over year, due to the various strategies employed by the fund. Another may need to highlight the maturity bands of fixed income; another the association of assets which are affiliated securities of the fund. The GL processing system, according to a preferred embodiment of the invention, can employ multiple strategies for achieving flexibility in its allocation of posting activity to desired chart of account structures that best reflect the summaries of data that make sense for the given fund and client.

The COA may also organize data for a fund by integrating sub-ledgers, e.g., detail from derivatives, loans, private equity, alternatives, etc., or shadow periods for segregated manual journal activity. As an example, the primary accounting system may not track all the detail needed for a real estate holding, and may only have "one-line" entry for the real estate holding's total value. The GL processing engine can integrate detail from a specialized source to overlay this single line entry, thereby consolidating data from more than one source as needed.

The scalability of the GL processing system using a distributed big data platform such as Hadoop thus allows the system to run the same fund against more than one source and timing, and it can use a significant number of flexible data attributes in its chart of accounts rollups, to provide general ledger data availability satisfying a client's needs for insight into their data.

Figure 2:
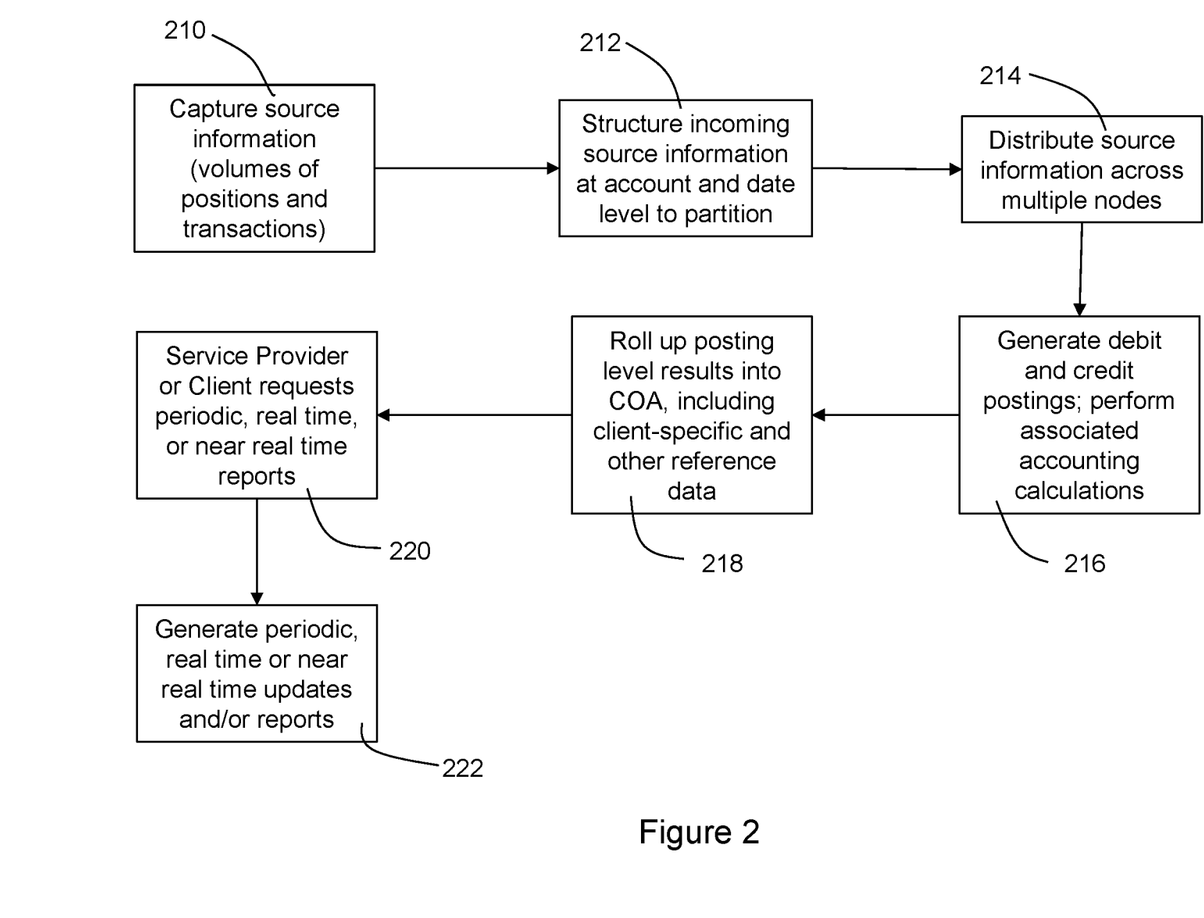
FIG. 2 is a flow chart illustrating a method for general ledger processing according to an exemplary embodiment of the invention.

According to another aspect, exemplary embodiments of the invention can create views in real time or in near real time as the GL processing system processes incoming data continuously in real time or in near real time, as illustrated in FIG. 2, steps 220 and 222. The GL processing system is preferably source-system-agnostic, to be fed by any set of positions and transaction activity including real time sources. The GL processing system can be designed to listen to real time transaction messages, and with each message break down into discrete amounts which are then posted per their posting rules, with a start of day initialization from a more batch oriented audited set of valued positions. This can then provide an intraday, preliminary real time view, for example, using the same grouping concepts/GL chart of account buckets which that fund is ultimately using to communicate its final, audited results.

Figure 3A:
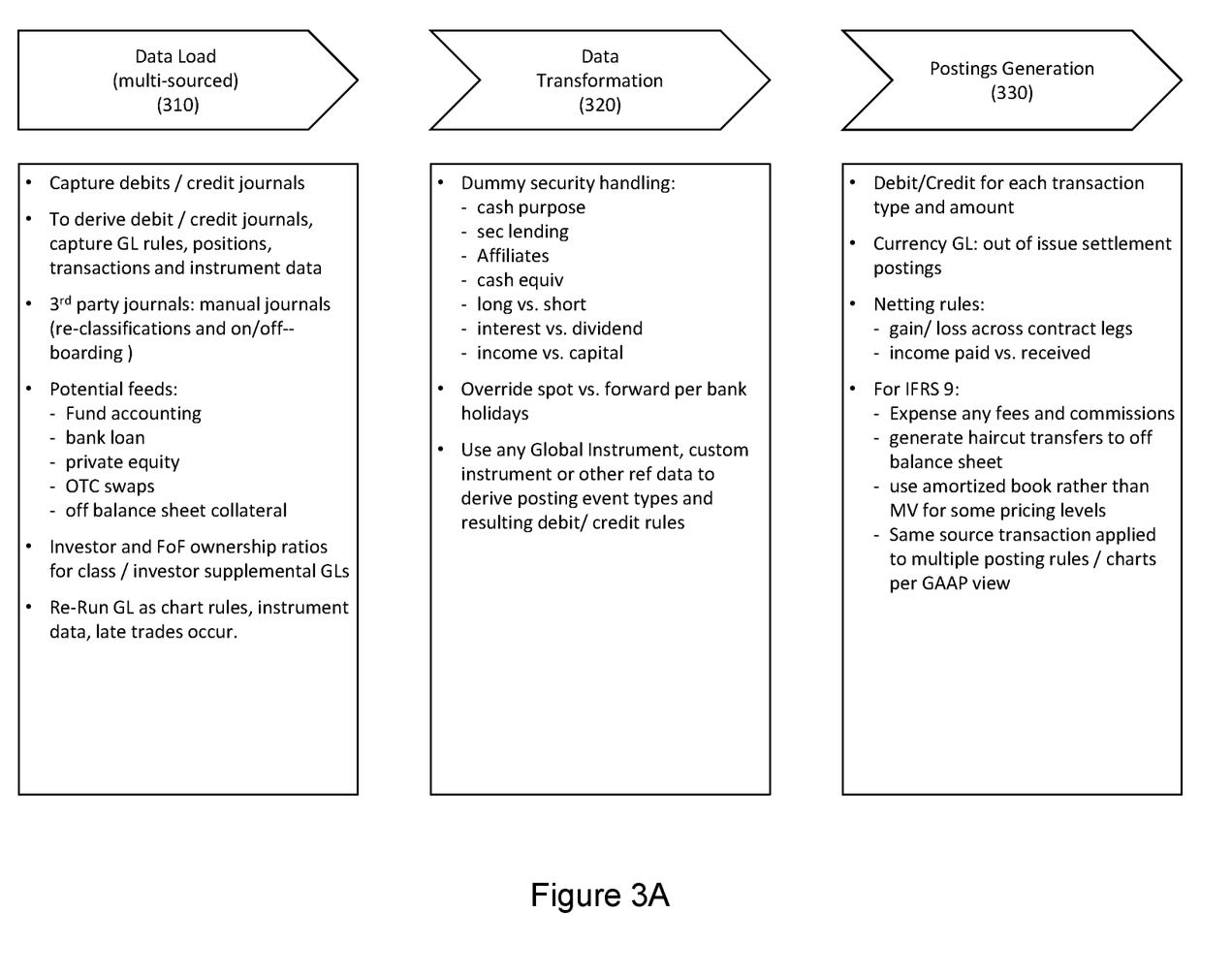
FIGS. 3A and 3B provide a summary of features for a general ledger logical processing flow according to an exemplary embodiment of the invention.
Figure 3B:
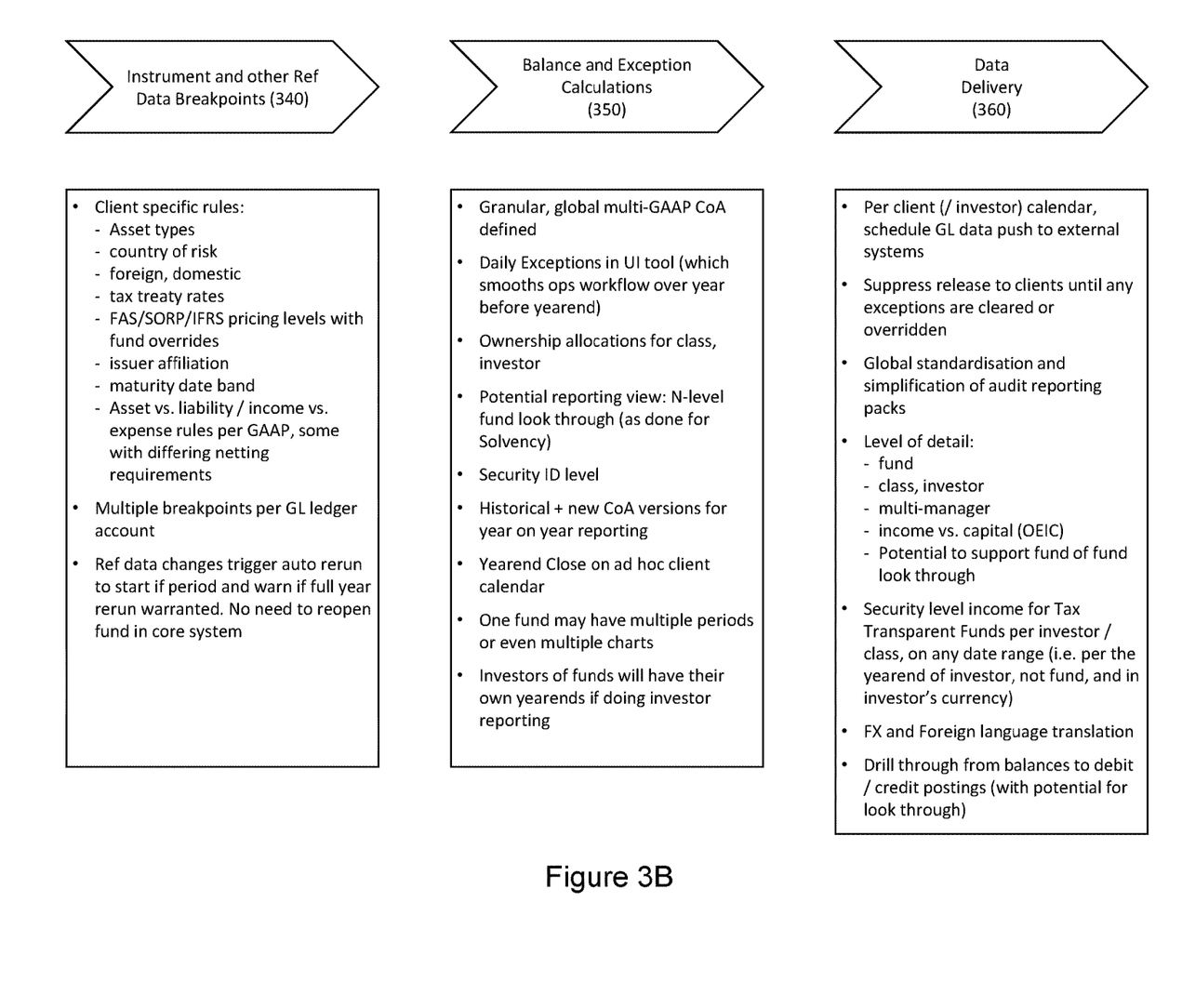

FIGS. 3A and 3B provide a summary of features for a general ledger logical processing flow according to an exemplary embodiment of the invention. As shown in FIGS.

3A and 3B, the processing flow includes six primary process steps, including data load 310, data transformation 320, postings generation 330, instrument and other reference data break points 340, balance and exception calculations 350, and data delivery 360. As explained above, source systems can supply debits and credits, if already provided at the appropriate level of detail. Alternatively, a source system can provide transactions, positions and reference data, and the GL system will derive the postings. In this way, the GL processing system according to exemplary embodiments of the invention is source system agnostic, and it facilitates aggregations using client specific chart of accounts, at a fund and/or corporate level, for multiple GAAP, multi-currency views of the accounting data.

In FIG. 3A, the multi-source data load process 310 may involve capturing debit/credit journals. In addition, debit/credit journals can be derived by capturing GL rules, positions, transactions and instrument data. The GL processing system may also ingest third party journals, such as manual journals which may involve re-classifications and on/off-boarding. Potential data feeds that may be ingested by the GL processing system include data feeds from third party systems for fund accounting, bank loans, private equity, OTC swaps, and off balance sheet collateral, for example. The GL processing system may also receive data for investor and fund of funds (FoF) ownership ratios for class/investor supplemental GLs. The GL processing system can also be configured to re-run the GL processing, for example, as chart rules, instrument data, and late trades occur.

The next step of the processing flow in FIG. 3A is data transformation 320. As shown in FIG. 3A, the data transformation step may involve dummy security handling to account for a cash purpose, securities lending, affiliates, cash equivalents, long vs. short positions, interest vs. dividend accounting, and income vs. capital accounting. The GL processing system may be configured to override spot vs. forward according to bank holidays. The system may be programmed to use any global instrument, custom instrument or other reference data to derive posting event types and the resulting debit and credit rules.

The next step of the processing flow in FIG. 3A is the generation of postings 330. Postings generation 330 may involve generation of a debit/credit for each transaction type and amount. A currency GL may be derived out of issue settlement postings. Netting rules may be determined according to gain/loss across contract legs, and income paid vs. received. In accordance with International Financial Reporting Standards 9 (Financial Instruments), the GL processing system may be programmed to expense any fees and commissions, generate haircut transfers to off balance sheet, use amortized book value rather than market value for some pricing levels, and apply the same source transaction to multiple posting rules/charts according to GAAP view.

The next step of the processing flow is the determination of break points by instrument and other reference data 340 as shown in FIG. 3B. This process may involve, for example, the application of client-specific rules as applied to asset types, country of risk, foreign vs. domestic assets, tax treaty rates, FAS/SORP/IFRS pricing levels with fund overrides, issuer affiliation, maturity date band, and asset vs. liability/income vs. expense rules per GAAP, some with differing netting requirements, for example. The GL processing system may generate multiple breakpoints per GL ledger account, according to one example. The GL processing system may be programmed to monitor changes in reference data and to trigger an automatic rerun either from a designated start date, or, if warranted, a full year rerun.

The next step of the processing flow is the calculation of balances and exceptions 350 as shown in FIG. 3B. In this step 350, granular, global multi-GAAP charts of accounts are defined, and a user interface (UI) tool can determine daily exceptions, which smooths the operations workflow over the year before yearend. Ownership allocations can be defined by class and investor. A reporting view can be generated having an N-level fund look through. The calculations can be executed according to the security ID level and can include historical and new charts of accounts versions for year on year reporting. The GL processing system can be programmed to calculate a year end close according to an ad hoc client calendar. One fund may have multiple periods or even multiple charts, and investors of funds may have their own year ends if conducting investor reporting.

The next step of the processing flow is data delivery 360 according to an exemplary embodiment of the invention. In this step, the data delivery may be scheduled according to the client and/or investor calendar, and may comprise a data push to external systems. The GL processing system may be designed to suppress the release of data to clients until any exceptions are cleared or overridden. The GL processing system may be configured to incorporate global standardisation and simplification of audit reporting packs. The GL processing system may deliver data at a level of detail that designates the fund, class, investor, multi-manager, income vs. capital (OEIC), and fund of fund look through. The GL processing system may also report data concerning the security level income for tax transparent funds according to investor/class, on any date range (e.g., per the yearend of the investor, not the fund, and in the investor's currency). The system may also report foreign exchange (FX) data and may provide foreign language translation. The system may also provide the user with the ability to drill through from balances to debit/credit postings (with potential for look through).

FIG. 4 provides a summary of some of the advantageous features of the GL processing system according to an exemplary embodiment of the invention. As shown in FIG. 4, the GL processing system may include a number of functionalities, such as currency level general ledger, debit/credit postings detail, and client custom instrument and transaction COA criteria, such as details and categorization by region, maturity band, custom asset class, dummy cash purpose, IFRS holding intent, impairment level, and affiliate security. Additional features may also include share class general ledger, investor level (e.g., for tax transparent funds), tax lot (e.g., long/short term general ledger in the USA), fund of fund look through, handling of multi-GAAP posting distinctions, and third party journal interfaces (e.g., for onboardings or other external). The GL processing system can also provide financial reporting as a periodic feed according to the client's calendar, or as GL bucketed data on an intraday or near real time basis.

The GL processing system can include features and functionality to enhance data integrity, such as automatic notification of exceptions for unclassified postings, misclassified postings, or unbalance postings; reconciliation of general ledger detail with the accounting source; accuracy checks to stop reporting to clients in the event of severe exceptions; redundant checks on manual journals, with GL signoffs and reruns; and fund of fund sequencing and balance checks. The GL processing system can include a functionality to re-run a report upon instrument and/or metadata changes, as compared to reference data that is maintained. The GL processing system can be designed to easily accept and absorb new source data fields, including client-specific data fields. This feature is not constrained to particular data sources, as is the case with known accounting-system GLs or with an existing in-house data warehouse to only have access to accounting specific, in-house sources. The GL processing system may also include operational tools to configure GL meta data. The GL processing system can also be configured to provide output data to service providers and their clients through various output channels and via application programming interfaces (APIs).

FIG. 5A provides an illustration of general ledger processing according to an exemplary embodiment of the invention. FIG. 5A shows a few key aspects of functionality. First, the source may have many source transaction types that are ultimately posted in a similar manner (in this case as a 'BUY' of some asset). Second, the transaction will be associated with all its discrete amounts. Third, the same amounts may post under different GAAP driven event posting rules, in this case treating commissions as either part of the capitalized cost basis of the asset (standard GAAP) or as expense (IFRS GAAP). And finally, the illustration indicates that the scale permitted using big data technology (e.g., Hadoop) permits all data to be maintained per security, per transaction. This detail is then rolled up and summarized into desired chart of accounts, permitting drill through from summary level balances to detailed security level balances, and through to the debit and credit activity from which those balances resulted. As shown in FIGS. 5B and 5C, the postings created in FIG. 5A result in ample balance rollups created for two distinct GAAP requirements applied for the same fund and instrument.

Exemplary embodiments of the invention can provide a number of advantages to service providers and their clients. For example, the speed of the GL processing system can be a significant advantage. Front office decision makers can benefit by viewing rollups of positions and activity coming from real time, near real time, and/or what-if order modeling inventory control systems. Having real-time/what-if data mapped into the same chart of account buckets as the back office fund and financial reporting can provide key insights specific to the client's rollup criteria. This capability to integrate with near real time sources of data is an advantageous feature of the GL system according to exemplary embodiments of the invention, since known GL systems are tied to existing batch-based accounting systems only. In addition, the GL processing system can provide a solution to the scale and adaptability demands of a broad client base of fund accounting service providers. The GL processing system can serve as an aggregator of postings from varied sources, and it can also aggregate posting activity from third party client-side systems. The GL processing system can be configured as a general ledger data hub against multiple views on client data, combining data housed in several source systems. It can leverage enterprise account and client reference data, and this can be used to support drill through across a client's fund of funds, regardless of data source. Client security and classifications reference data can be captured and leveraged. Integration with real time order modelling position management can provide data in the same chart of account buckets as leveraged for past period financial reporting, thereby providing better insight on data for a client, using the buckets best reflective of their organizations and their strategies.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

The personal computing devices 124, 134 depicted in FIG. 1 may comprise a desktop computer, laptop computer, smart phone, or a tablet computer, or other mobile device, for example. The personal computing devices 124, 134 may include hardware and software to enable communication with a cellular network, a WiFi network, and a Bluetooth channel, for example.

Data and information maintained by the servers shown by FIG. 1 may be stored and cataloged in one or more databases, which may comprise or interface with a searchable database and/or a cloud-based database. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network 110 in FIG. 1 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network 110 may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of personal computing devices 124, 134 are shown in FIG. 1, exemplary embodiments of the invention may utilize other types of communication devices whereby a user may interact with a network that transmits and delivers data and information used by the various systems and methods described herein. The personal computing device may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The personal computing devices 124, 134 may include various connections such as a cell phone connection, WiFi connection, Bluetooth connection, satellite network connection, and/or near field communication (NFC) connection, for example.

As described above, FIG. 1 includes a number of servers 120, 122, 130, 132, 140, 150, 160 and user communication devices 124, 134, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices 124, 134. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for scalable, customized general ledger processing for a financial institution, the method comprising:

receiving a request from a client for one or more reports relating to one or more customized charts of accounts (COAs) for a specified time frame, wherein the one or more customized COAs include client-specific data and third party reference data;

automatically receiving, via one or more sub-processes running on each node in a Hadoop cluster, source information from a plurality of accounting software systems for one or more global fund services divisions of the financial institution, specialized systems for tracking derivatives, hank loans, private equity and alternative investments, and third-party sources for tracking sources held outside the financial institution, post tax or regulatory adjusting entries, and other memo entries, the source information comprising accounting data including position data and transaction data, as well as reference metadata comprising information defining one or more general ledger events, chart of accounts, posting rules, and mapping data;

structuring the source information by partitioning the accounting data at an account and a date level for distributed, parallel processing;

distributing the partitioned source information in a statistically even distribution across a plurality of nodes in a distributed computer architecture used for parallel storage and processing;

generating debit and credit postings for a balance, sheet, the postings comprising per transaction amount postings, per type postings, per GAAP postings, and per lifecycle data, using the reference metadata to define one or more rules for generation of the debit and credit postings, by performing one or more accounting calculations on the statistically evenly distributed source information simultaneously across the plurality of nodes in the distributed computer architecture, the one or more rules comprising a simple mapping of the debit and credit postings from a source account to one or more target accounts when the source information includes one or more debit and credit journals, and a construction of the debit and credit postings from a plurality of transaction parameters identified from the transaction data;

simultaneously creating, with the debit and credit postings, a plurality of discrete views for one of the one or more customized COAs, the plurality of discrete views comprising one or more client view and a plurality of separately calculated GAAP views accounting for disparate GAAP periodicity, timing, FIFO/average cost method, and amortization, wherein the separately calculated GAAP views are created by processing a plurality of transactions comprising the transaction data under a plurality of varied GAAP methods, and further including event subtype qualifiers defining a purpose behind one or more fields and security IDs; and providing the client requested one or more reports electronically to the client in accordance with the specified time frame.

2. The method of claim 1, wherein the distributed computer architecture comprises a scalable Hadoop database distributed across the plurality of nodes.

3. The method of claim 2, wherein the third party reference data comprises accounting data for at least one of: over the counter (OTC) swaps, bank loans, private equity, hedge funds, and off balance sheet collateral.

4. The method of claim 2, further comprising:
automatically identifying exceptions based on the source information;
suppressing a release of the customized COAs until the exceptions are cleared; and
automatically re-running generation of the customized COAs based on the exceptions.

5. The method of claim 2, further comprising the step of adding a new data feed of source information based on the request from the client for the plurality of customized COAs.

6. The method of claim 2, wherein the step of generating debit and credit postings from the source information comprises deriving posting event types and resulting debit and credit rules from instrument data or other reference data.

7. The method of claim 2, wherein the step of providing the customized COAs electronically to the client comprises providing the customized COAs through a client-specific application programming interface (API).

8. The method of claim 2, wherein the step of providing the customized COAs electronically to the client comprises providing the customized COAs through a client-specific web browser interface.

9. The method of claim 2, wherein the specified time frame comprises a plurality of intra-day data deliveries.

10. The method of claim 2, wherein the specified time frame is defined according to a client-specified calendar.

11. The method of claim 2, wherein the specified time frame comprises real time or near real time.

12. A computer-implemented system for scalable, customized general ledger processing for a financial institution, the system comprising:
a memory; and
a processor that is programmed to:
receive a request from a cheat for one or more reports relating to one or more customized charts of accounts (COAs) for a specified time frame, wherein the one or more customized COAs include client-specific data and third party reference data;
automatically receive, via one or more sub-processes running on each node in a Hadoop cluster, source information from a plurality of accounting software systems for one or more global find services divisions of the financial institution, specialized systems for tracking derivatives, hank loans, private equity and alternative investments, and third-party sources for tracking sources held outside the financial institution, post tax or regulatory adjusting entries, and other memo entries, the source information comprising accounting data including position data and transaction data, as well as reference metadata comprising information defining one or more general ledger events, chart of accounts, posting rules, and mapping data;
structure the source information by partitioning the accounting data at an account and a date level for distributed, parallel processing;
distribute the partitioned source information in a statistically even distribution across a plurality of nodes in a distributed computer architecture used for parallel storage and processing;
generate debit and credit postings for a balance sheet, the postings comprising per transaction amount postings, per type postings, per GAAP postings, and per lifecycle data, using the reference metadata to define one or more rules for generation of the debit and credit postings, by performing one or more accounting calculations on the statistically evenly distributed source information simultaneously across the plurality of nodes in the distributed computer architecture, the one or more rules comprising a simple mapping of the debit and credit postings from a source account to one or more target accounts when the source information includes one or more debit and credit journals, and a construction of the debit and credit postings from a plurality of transaction parameters identified from the transaction data;

simultaneously create, with the debit and credit postings, a plurality of discrete views for one of the one or more customized COAs, the plurality of discrete views comprising one or more client view and a plurality of separately calculated GAAP views accounting for disparate GAAP periodicity, timing, FIFO/average cost method, and amortization, wherein the separately calculated GAAP views are created by processing a plurality of transactions comprising the transaction data under a plurality of varied GAAP methods, and further including event subtype qualifiers defining a purpose behind one or more fields and security IDs; and provide the client requested one or more reports electronically to the client in accordance with the specified time frame.

13. The system of claim 12, wherein the distributed computer architecture comprises a scalable Hadoop database distributed across the plurality of nodes.

14. The system of claim 13, wherein the third party reference data comprises accounting data for at least one of: over the counter (OTC) swaps, hank loans, private equity, hedge funds, and off balance sheet collateral.

15. The system of claim 13, wherein the processor is further programmed to:

automatically identify exceptions based on the source information;

suppress a release of the customized COAs until the exceptions are cleared; and automatically re-run generation of the customized COAs based on the exceptions.

16. The system of claim 13, wherein the processor is further programmed to add a new data, feed of source information based on the request from the client for the plurality of customized COAs.

17. The system of claim 13, wherein the processor, in generating debit and credit postings from the source information, is further programmed to derive posting event types and resulting debit and credit rules from instrument data or other reference data.

18. The system of claim 13, wherein the processor, in providing the customized COAs electronically to the client, is further programmed to provide the customized COAs through a client-specific application programming interface (API).

19. The system of claim 13, wherein the processor, in providing the customized COAs electronically to the client, is further programmed to provide the customized COAs through a client-specific web browser interface.

20. The system of claim 13, wherein the specified time frame comprises a plurality of intra-day data deliveries.

21. The system of claim 13, wherein the specified time frame is defined according to a client-specified calendar.

22. The system of claim 13, wherein the specified time frame comprises real time or near real time.

* * * * *